(12) United States Patent
Grebenschikov et al.

(10) Patent No.: US 9,455,876 B1
(45) Date of Patent: Sep. 27, 2016

(54) METHOD AND STANDARD FOR INTEGRATING APPLICATIONS INTO A CLOUD

(71) Applicants: Vladimir Grebenschikov, Moscow (RU); Alexander G. Tormasov, Moscow (RU); Maxim Kuzkin, Moscow (RU); Victor Kupriyanov, Moscow (RU); Michael Toutonghi, Seattle, WA (US); Ilya Baimetov, Redmond, WA (US); Alexey Kobets, Moscow (RU)

(72) Inventors: Vladimir Grebenschikov, Moscow (RU); Alexander G. Tormasov, Moscow (RU); Maxim Kuzkin, Moscow (RU); Victor Kupriyanov, Moscow (RU); Michael Toutonghi, Seattle, WA (US); Ilya Baimetov, Redmond, WA (US); Alexey Kobets, Moscow (RU)

(73) Assignee: INGRAM MICRO INC., Irvine, CA (US)

( * ) Notice: Subject to any disclaimer, the term of this patent is extended or adjusted under 35 U.S.C. 154(b) by 737 days.

(21) Appl. No.: 13/756,821

(22) Filed: Feb. 1, 2013

(51) Int. Cl.
*G06F 15/173* (2006.01)
*H04L 12/24* (2006.01)
*H04L 29/06* (2006.01)
*H04L 29/08* (2006.01)

(52) U.S. Cl.
CPC .............. *H04L 41/20* (2013.01); *H04L 67/10* (2013.01); *H04L 67/42* (2013.01)

(58) Field of Classification Search
None
See application file for complete search history.

(56) References Cited

U.S. PATENT DOCUMENTS

| | | | | |
|---|---|---|---|---|
| 6,633,313 | B1* | 10/2003 | Cirne | G06F 9/542 715/733 |
| 7,185,333 | B1* | 2/2007 | Shafron | G06F 9/4448 715/744 |
| 7,370,322 | B1* | 5/2008 | Matena | G06F 8/65 709/217 |
| 7,949,574 | B2* | 5/2011 | Patel | G06Q 20/108 235/375 |
| 8,260,893 | B1* | 9/2012 | Bandhole | G06F 9/5083 709/221 |
| 8,974,279 | B1* | 3/2015 | Nowak | 273/138.2 |
| 9,015,668 | B1* | 4/2015 | Michelsen | G06F 8/70 717/120 |
| 2003/0028686 | A1* | 2/2003 | Schwabe | G06F 9/45504 719/332 |
| 2003/0100307 | A1* | 5/2003 | Wolochow | H04W 48/18 455/440 |
| 2003/0220944 | A1* | 11/2003 | Lyman Schottland | G06F 8/68 |

(Continued)

OTHER PUBLICATIONS

Parallels et al. "APS Package Certification Guide" APS Standards Publication 2010.*

(Continued)

*Primary Examiner* — Joshua Joo
*Assistant Examiner* — Younes Naji
(74) *Attorney, Agent, or Firm* — Bardmesser Law Group

(57) ABSTRACT

An Application Packaging Standard (APS) is a specification defining application's life cycle in a cloud. The application's life cycle includes packaging, delivering to the cloud, verification of package, integrating (and unpacking) into the cloud, distributing to clients, licensing, functionality, updates and deletion. The APS has its own Application Programming Interface (API) for accessing the APS functions from a program code or by http/https requests. The APS provides for efficient integration of SaaS web applications into the cloud.

26 Claims, 10 Drawing Sheets

(56) References Cited

U.S. PATENT DOCUMENTS

| | | | | |
|---|---|---|---|---|
| 2004/0153998 A1* | 8/2004 | McGuire | G06F 9/542 | 717/128 |
| 2004/0190092 A1* | 9/2004 | Silverbrook | G06F 3/0317 | 358/539 |
| 2008/0022385 A1* | 1/2008 | Crowell | H04L 63/0263 | 726/11 |
| 2008/0189713 A1* | 8/2008 | Betzler | H04L 12/24 | 718/104 |
| 2008/0250045 A1* | 10/2008 | Balassanian | G06F 17/30569 | |
| 2008/0275939 A1* | 11/2008 | Martin | G06F 8/61 | 709/203 |
| 2008/0307047 A1* | 12/2008 | Jowett | G06F 8/38 | 709/203 |
| 2009/0235204 A1* | 9/2009 | Kaehler | G06F 9/541 | 715/804 |
| 2009/0240698 A1* | 9/2009 | Shukla | G06F 17/30286 | |
| 2009/0249464 A1* | 10/2009 | Chang | G06F 21/567 | 726/11 |
| 2009/0293062 A1* | 11/2009 | Amir | G06F 9/485 | 718/104 |
| 2010/0042720 A1* | 2/2010 | Stienhans | G06F 9/5072 | 709/226 |
| 2010/0312817 A1* | 12/2010 | Steakley | G06F 8/61 | 709/202 |
| 2011/0113473 A1* | 5/2011 | Corda | G06Q 20/32 | 726/3 |
| 2012/0022948 A1* | 1/2012 | Jones | G06Q 30/0267 | 705/14.64 |
| 2012/0096163 A1* | 4/2012 | Tai | H04L 41/0856 | 709/226 |
| 2012/0102283 A1* | 4/2012 | Okamura | H04N 1/4433 | 711/163 |
| 2012/0116973 A1* | 5/2012 | Klein | G06Q 20/108 | 705/44 |
| 2012/0130807 A1* | 5/2012 | Steelberg | G06Q 30/0241 | 705/14.49 |
| 2012/0291063 A1* | 11/2012 | Holden | H04H 20/42 | 725/32 |
| 2013/0227014 A1* | 8/2013 | Song | H04L 67/10 | 709/204 |
| 2013/0283298 A1* | 10/2013 | Ali | G06F 9/5077 | 719/319 |
| 2014/0007222 A1* | 1/2014 | Qureshi | G06F 21/10 | 726/16 |
| 2014/0109077 A1* | 4/2014 | Ashar | G06F 9/44 | 717/171 |
| 2014/0130043 A1* | 5/2014 | Mahindru | G06F 9/45558 | 718/1 |

OTHER PUBLICATIONS

Parallels et al. "Application Packaging Developers Guide" Revision 1.0.19—APS Standards Publication 2011.*

* cited by examiner

METHOD AND STANDARD FOR INTEGRATING APPLICATIONS INTO A CLOUD

BACKGROUND OF THE INVENTION

1. Field of the Invention

This invention relates to a method and a standard for application packaging and integration, and, more particularly, to application resource integration and deployment into a cloud.

2. Description of the Related Art

Computer systems present some challenges with regard to delivering and installing new applications. Software as Service (SaaS) web applications are integrated into systems by a vendor using special delivery and installation packages. However, if the vendor needs to integrate/deploy his application into a cloud, he would have to repeat all integration operations for each host or hosting platform several times. The hosts and the hosting platforms have applications that control the host or the hosting platforms. These applications make it very difficult and expensive to integrate external (third party) applications or web services. However, for the vendor to himself develop host-specific applications is even more expensive.

Currently, integration of applications into hosts and hosting platforms is implemented using two classes of applications—a Control Panel and a Service Controller. In case of a cloud, these programs are inefficient and have to be used several times by a vendor in order to integrate a single application into the cloud.

The clouds (or cloud servers) is a software-hardware combination of a host provider, which provides for functionality of external applications in its client's accounts.

Accordingly, there is a need in the art for an efficient and inexpensive method for integration of applications into the clouds.

SUMMARY OF THE INVENTION

Accordingly, the present invention is related to a method and a standard for application integration and deployment into a cloud that substantially obviates one or more of the disadvantages of the related art.

An Application Packaging Standard (APS) is specification defining application's life cycle in a cloud. The application's life cycle includes packaging, delivering to the cloud, integrating (and unpacking/deploying) into the cloud, distributing to clients, licensing, functionality, updates and deletion.

The APS has its own Application Programming Interface (API) for accessing the APS functions from a program code or by http/https requests. The APS provides for efficient integration of SaaS web applications into the cloud.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

According to an exemplary embodiment, an Application Packaging Standard (APS) is a specification defining application's life cycle in a cloud. The application's life cycle includes packaging, delivering to the cloud, integrating (and deploying) into the cloud, distributing to clients, licensing, functionality, updates and deletion.

The APS has its own Application Programming Interface (API) for accessing the APS functions from a program code or by the "http/https" requests. The APS provides for efficient integration of SaaS web applications into a cloud. According to the exemplary embodiment, the APS applications can be divided into three types:

Web Applications—a simple type of applications that are physically distributed among cloud clients. This means that one copy of the application (files, database, configurations settings, etc.) belongs to one user. For example, Content Management Software (CMS) applications are distributed to the cloud users.

Dedicated Applications—complex type of applications that require close communications with the Operating System. The Dedicated Applications require virtualization (for example in a form of containers). A container is a closed set or a collection of processes, system resources, users, groups of users, objects and data structures. Each container virtualizes a single instance of an operating system and has its own ID or some other identifier, which distinguishes it from other containers.

Connector Applications—programmable bridges for connecting to remote services and controlling them.

Figure 1:
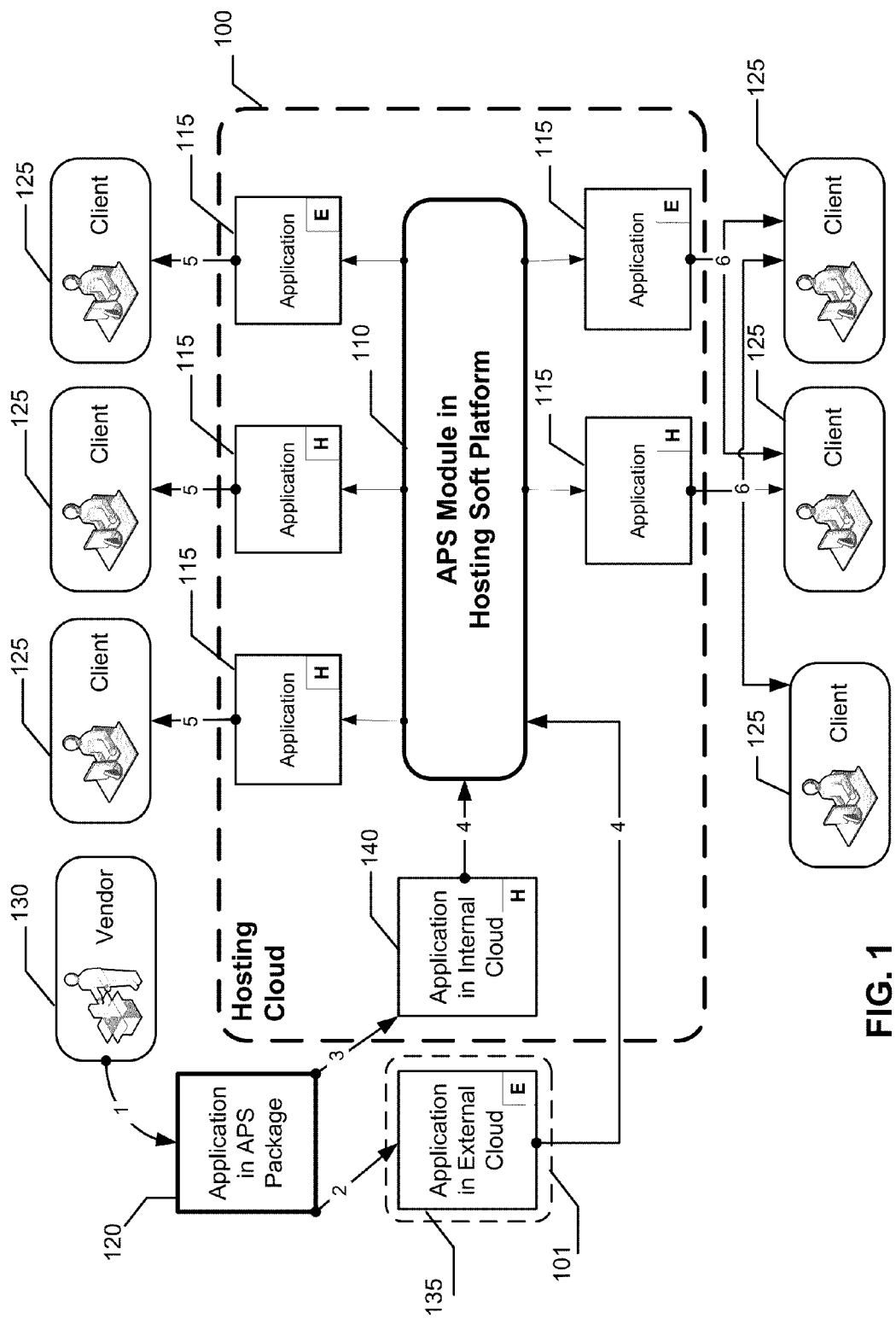
FIG. 1 illustrates integration of vendor applications in to a cloud using the APS, in accordance with the exemplary embodiment.

FIG. 1 illustrates integration of vendor applications into a cloud using the APS, in accordance with the exemplary embodiment. According to the exemplary embodiment, in order for an application to function according to the APS, an APS module 110 (i.e., a controller) is integrated into a software hosting platform of a hosting cloud 100. The module 110 serves as a connector for controlling application(s) 115. The controller module 110 receives application control requests and the controller module 110 distributes the requests to appropriate scripts of application APS package 120. Application(s) 115 responses to clients 125 (outside of the cloud 100) are also processed by the controller module 110 and provided to the clients 125.

According to the exemplary embodiment, a vendor 130 packages his application according to the APS. The format of the package depends on the receiver. If the receiver is a standard Windows™ desktop, then the software can be packaged using standard installers, and the file has a *.exe or *.msi extension. The installer includes unpacking rules, that includes a user dialog, writing into the registry, checking for updates, and so on. In the case of APS, the packed file has a .app.zip extension, and includes metadata, scripts and software code itself.

An exemplary application 135 (type E) is located in an external cloud 101. An application 140 (type H) is located inside the hosting cloud 100. The APS module 110 distributes the applications 135 and 140 to the clients 125. One application can be delivered to one client or to multiple clients, as shown in FIG. 1.

Figure 2:
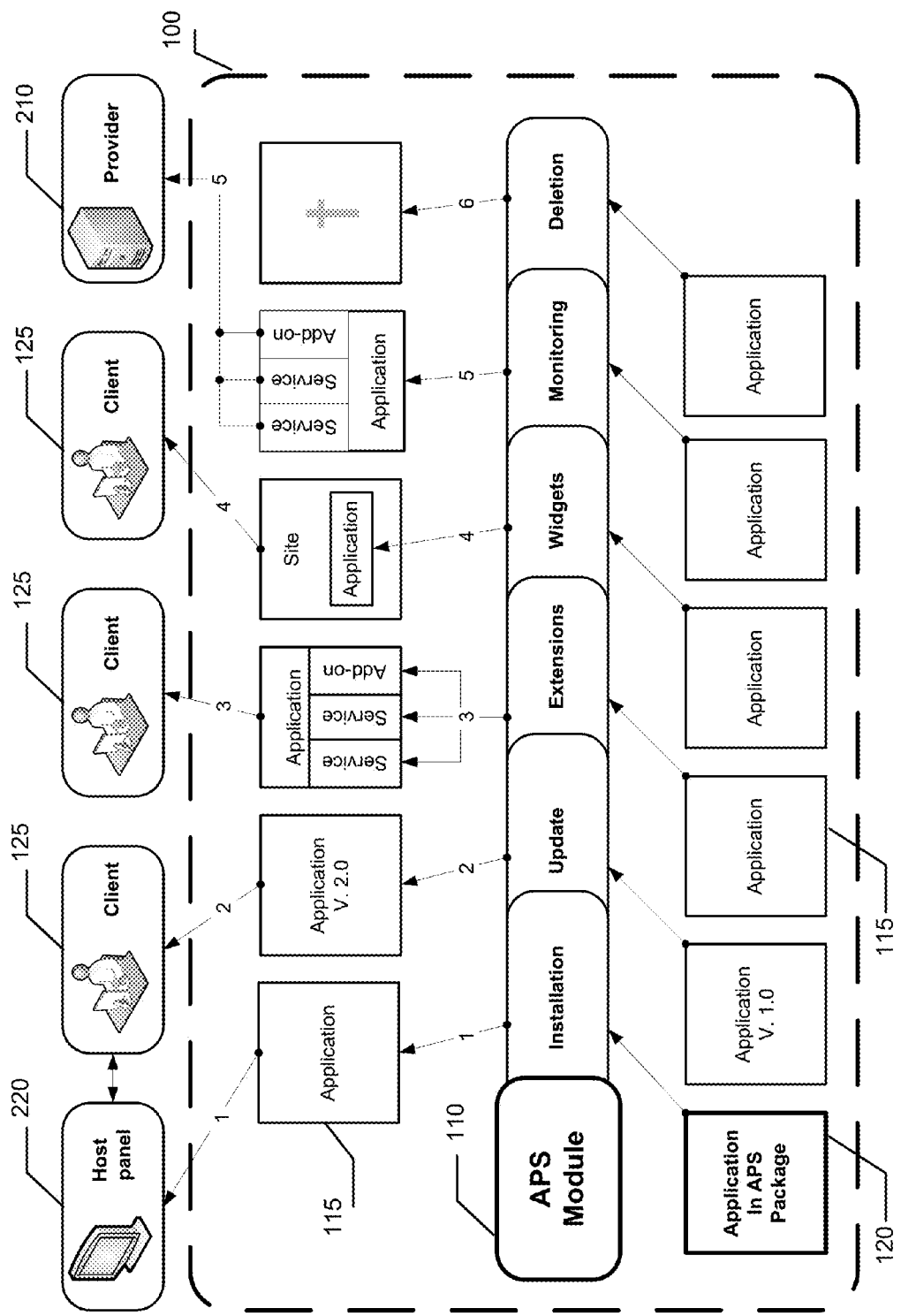
FIG. 2 illustrates a functionality of the APS in the cloud, in accordance with the exemplary embodiment.

FIG. 2 illustrates a functionality of the APS in the cloud, in accordance with the exemplary embodiment. In order to integrate an application into a hosting cloud (platform) 100, two main applications are used—a Control Panel and a Service Controller. According to the exemplary embodiment, the APS replaces these applications and, advantageously, simplifies installation, control, application billing for the hosting party, as well as for the vendor. Additionally, the APS gives some extra means for using the applications. For example, a single catalog of APS applications, from which the hoster or the client can download an application, see http:**apsstandard.org/applications#addon=false Alternatively, a mechanism for rating applications can be provided, based on different criteria, either from an interface within the application or from an interface provided by the catalog. Alternatively, a plugin can be added by the hoster to all applications that clients downloaded from that hoster, all at once. Users can be allowed to vote on each application, and thereby increase its rating in the APS catalog. Such a vote can be done both from the catalog or from within the application itself. Thus, the collected information can include votes, ratings, social network "likes", ratings of users, and so on. The application can be sold either through another Internet-store, or through an intermediary with which the revenue is shared. In the latter case, the sale is impossible without performing certain operations relating to billing and the intermediary. The intermediary can have his own online store, and the APS standard automatically adds the intermediary to the list of entities that derive revenue from the sale of the application. Also, there can be an option to prohibit the sale without specific operations that relate to the intermediary. For example option URL=www.intermediary_site.com. If required for sale, it must come from this URL, otherwise, the sale is rejected. Alternatively, the option intermediary_ID=12345iF678—if parameters of the sale require it, then sale is permitted, otherwise, if the ID is not provided, the sale is rejected.

As shown in FIG. 2, the application 115 becomes available to the clients 125 through the hosting panel 220 using the cloud 100 and application package 120. The application package 120 provides for installation of the application 115 into the cloud 100. Update of the application 115 to a next version (for example, v. 2.0) is performed via the APS module 110. Functionality of the application 115 can be extended by adding services and add-ons. A widget application can be integrated, for example, into the site or Control Panel of client 125.

According to the exemplary embodiment, the APS module monitors resource usage by the application and provides this data to the provider 210. The application 115 can be deleted from a list of available applications and from the hard drive.

According to the exemplary embodiment, the files used in the APS package are:
  metadata files;
  control scripts;
  content files.

The APS strictly defines a set of files in the package, the file names, and a structure and syntax (in case of the metadata files). The APS package is a zip file having the extension ".app.zip." The metadata includes:
  APP-META.xml—main package metadata file;
  folder schema/—containing type definitions by application;
  APP-LIST.xml—a list of all package files, every file has a size in bytes and hash SHA256 (e.g.) value. The list of all package files can be digitally signed by one or several packagers or authorities.

According to the exemplary embodiment, the control script files are located in a folder/scripts/. The control scripts are used for launch of the application on the server, for the application update, for extending the application and for the application deletion. The folder/scripts/also contains configuration files that define application parameters. The content is the actual application files, icons and screenshots. An example of a package structure is provided in the appendix i.

According to the exemplary embodiment, each package contains (in its root directory) a file APP-META.xml where all package metadata is listed. An exemplary file APP-META.xml in RELAX NG notation is provided in the appendix ii. The APP-META.xml has to be valid according to the APS. If the APS package files change, the APP-META.xml has to change accordingly. Otherwise, some collisions occur and the installation of the package cannot be performed (partially or entirely).

Note that some elements and parameters of the RELAX NG notation of the APP-META.xml (see appendix ii) are mandatory (i.e., the package does not work without them) and some are optional and can be omitted. Some of the identical elements with different values can be present in the file (or in the parent element) in several copies. Some other elements can be present only as one original copy in the file (or parent element). For example, in RELAX NG notation:
  element vendor {
  element name {text}+,
  element homepage {xsd:anyURI}*,
  element icon {attribute path {text}}?
  }?, The optional parent element contains three child elements. The element itself can occur 0 or 1 times (indicator "?"). However, if it does occur, then it can contain three elements: name—required element, and can occur 1 or more times (indicator "+"); homepage—optional element, can occur 0 or more times (indicator "*"); icon—optional element, can occur only 1 time (indicator "?").

According to the exemplary embodiment, the application is described in the APP-META.xml as follows, using special tags:

| Property | Example |
|---|---|
| Application ID | <id>http:**www.phpbb.com/</id> |
| Package Name | <name>phpbb</name> |
| Package Version | <version>2.0.22</version><br>  <release>6</release> |
| Homepage | <homepage>http:**phpbb.com/</homepage> |
| Master package reference<br>(If a package is an add-on package) | <master-package><br>  <package id= http:**www.phpbb.com match= version = 1.1 /><br></master-package> |
| Software Vendor Information | <vendor><br>  <name>Broombla Corporation</name><br>  <homepage>http:**broombla.com</homepage><br>  <icon path= icons/broombla-corp-logo.gif /><br></vendor> |
| Software Packager Information | <packager><br>  <name>Parallels</name><br>  <homepage>http:**parallels.com</homepage><br>  <icon path= icons/parallels-package-logo.gif /><br>  <uri>uuid:15d041e8-34c6-409a-b165-3290d2c9d599</uri><br></packager> |
| Summary | <presentation><br>  <summary><br>    High powered, fully scalable, and highly customizable Open Source bulletin<br>    board package.<br>  </summary><br></presentation> |
| Description | <description><br>  phpBB is a high powered, fully scalable, and highly customizable<br>  Open Source bulletin board package. phpBB has a user-friendly<br>  interface, simple and straightforward administration panel, and<br>  helpful FAQ. phpBB is the ideal free community solution for all web<br>  sites.<br></description> |
| Icon | <icon path="images/phpbb.png" /> |
| Screenshots | <screenshot path="images/admin.png"><br>  <description>Administrative interface</description><br></screenshot><br><screenshot path="images/main.png"><br>  <description>Main page</description><br></screenshot> |
| Change log | <changelog><br>  <version version="2.1.22" release="1"><br>    <entry>New upstream version</entry><br>  </version><br>  <version version="2.1.21" release="5"><br>    . . .<br>  </version><br>  . . .<br></changelog> |
| Categories | <categories><br>  <category>Collaboration/Portals</category><br>  <category>Web/Content management</category><br></categories> |
| Languages | <languages><br>  <language>en</language><br>  <language>de</language><br>  <language>ru</language><br></languages> |
| Specification of exact updatable versions | <patch match="(version = '2.0' and release='1')<br>    or (version = '2.0' and release='2')" recommended="true" /><br><upgrade match="version = '1.0' and release='1'" /> |
| Specification of updatable version ranges | <patch match="version > '2.0'" recommended="true" /><br><upgrade match="version > '1.0'" /> |
| Upgrade using managed mode | <upgrade mode="managed"/> |
| Compare versions with vercmp | <patch match="vercmp(version,'2.1.0a') = 1"/> |
| License Agreement | <license must-accept="true"><br>  <free/><br>  <text><br>    <name>GPLv2</name><br>    <file>licenses/gplv2.txt</file><br>  </text><br>  <text xml:lang="de-DE"><br>    <name>GPLv2</name><br>    <file>licenses/gplv2-de_DE.txt</file><br>  </text><br><license |

The APS specification is strict, but flexible. The APS can extend the application functionality. For example, a file can have some space reserved for it in the package by describing the file in the metadata, but the file is not included into the current package. The APS can set an additional programming language for reading the configurations files. The APS supports add-ons. Also, a separate APS package can be an addition to another APS application.

Figure 3:
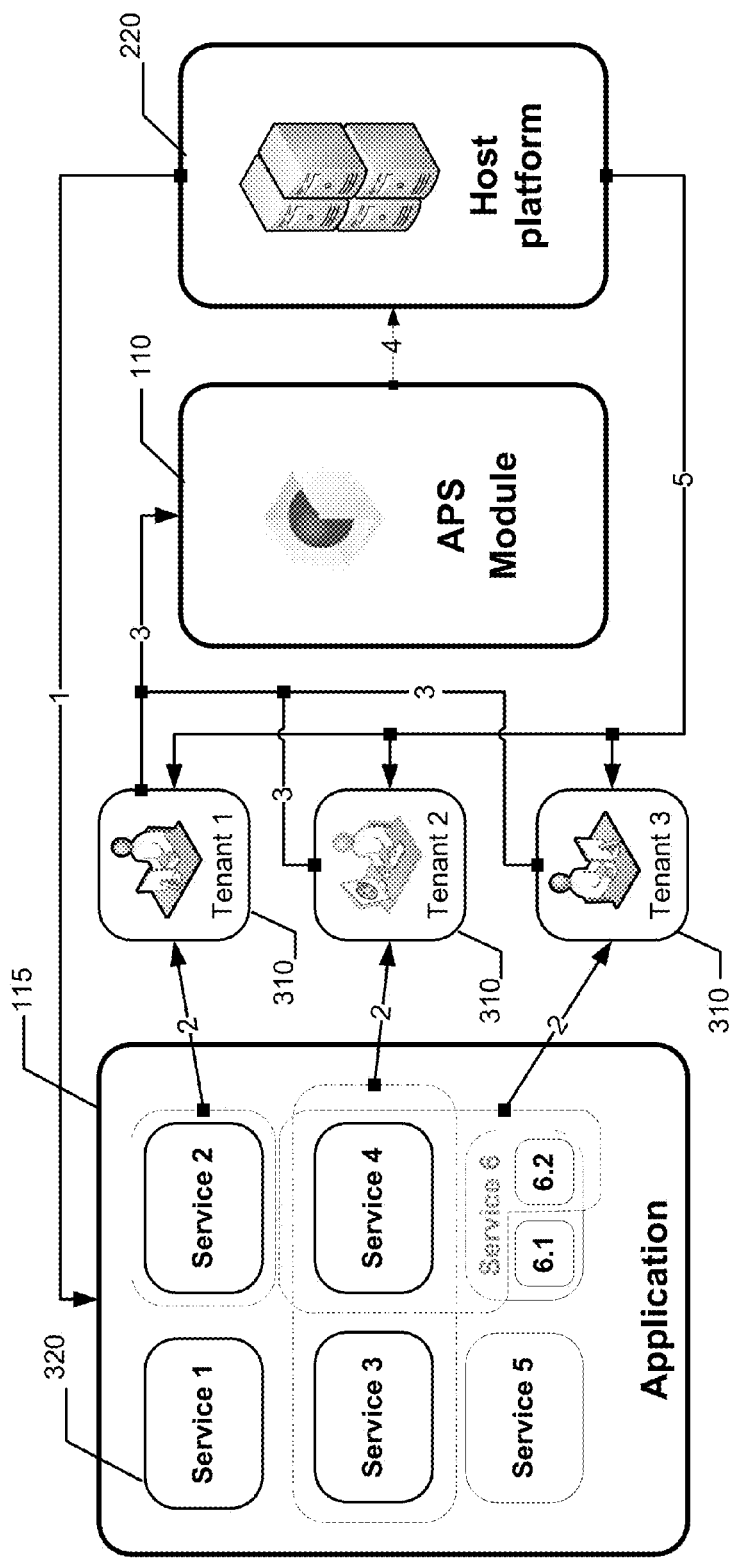
FIG. 3 illustrates a diagram of application services, in accordance with the exemplary embodiment.

FIG. 3 illustrates a diagram of application services, in accordance with the exemplary embodiment. According to the exemplary embodiment, the application 115 functions as a set of services. The APS applications support modularity in their structure. Thus, any application can provide separate services to the clients and other applications. The properties and parameters of the services are described in the APP-META.xml.

The host 220 gives resource usage quotas to the application 115. Tenants 310 acquire different services 320 (from different applications) from the provider 210 (see FIG. 2). The APS module 110 receives data reflecting current state of resource usage based on execution of the services 320. Then, the APS module 110 provides resource usage data (by each tenant 310) to the host platform 220. Subsequently, the host platform 220 bills the tenants 310 for resource usage.

According to the exemplary embodiment, the APS supports a service hierarchy. In other words, the service in the APS can be separated into the subservices so the host 220 (or the provider 210) can use different rates for different sets of services. Any service can be included or excluded. Additionally, a number of users of the service on the same account can be set as well. Note that the APS module 110 extracts data reflecting applications' 115 execution, which is not available to the host 220. For example, the APS module 110 can know an amount of a disk space occupied by a mail application, while the host 220 only knows the amount of space allocated for the mail application.

Figure 4:
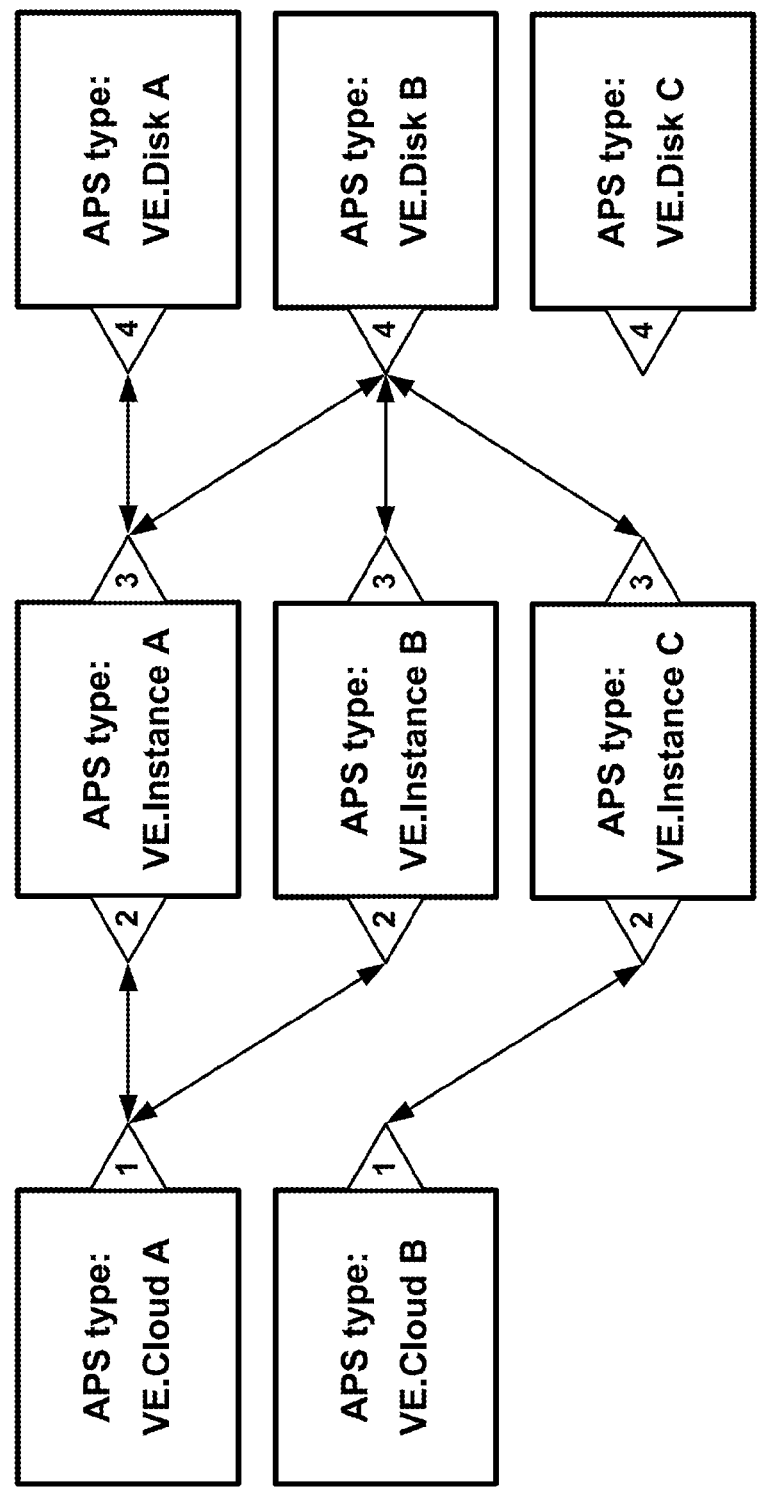
FIG. 4, illustrates connection of resources, in accordance with the exemplary embodiment.

FIG. 4 illustrates connection of resources, in accordance with the exemplary embodiment. In the APS system, a couple of resources can be connected using one of predefined connection types after the system checks if the connection is available. The connections are differentiated by a logic parameter—required (strong) and optional (weak), by a quantity parameter—only 1 (single) and from 0 to infinity (any).

In FIG. 4, connection 1 represents the "weak" connection of the type "any." Connection 2 represents the "strong" connection of the type "single." Connection 3 represents the "weak" connection of the type "any." Connection 4 represents the "weak" connection of the type "any."

According to the exemplary embodiment, the connections have different purposes. The connections unite the resources into one set or collection in order to rent the set as a single resource, bill it separately and collect statistics. The connections can support a parent-child hierarchy of the resources in order to define a separate functionality (service) within the application and rent it out separately from the parent application.

The connected resources can subscribe for notifications reflecting changes in the status of the connected resource. This is needed so after the changes occur in a monitored resource-object, the monitoring resource can make changes in its configuration.

In the APS system, a user can associate two resources with one of the predefined types of relations after the verification that such a possibility is available. Relations vary on a logical parameter: obligatory (Strong) and optional (Weak); and also by the quantitative parameter: only 1 (Single), from 0 to infinity (Any). See FIG. 4.

An APSlint utility validates the following:
Application package file format
Application package physical structure
Application package metadata file
As a result, the utility outputs the following data:
Errors indicating why a package fails to conform to the APS
Errors indicating requirements that a package must satisfy to attain a certain certification level
Total number of errors. If 0 errors occur, the package is successfully validated.

Typically, each APS Resource implements one or more APS Types. APS Type declaration provides all needed information on the Resource API. It also contains general information on the following 4 sections: Properties, Operations, Relations, Structures.

Figure 5:
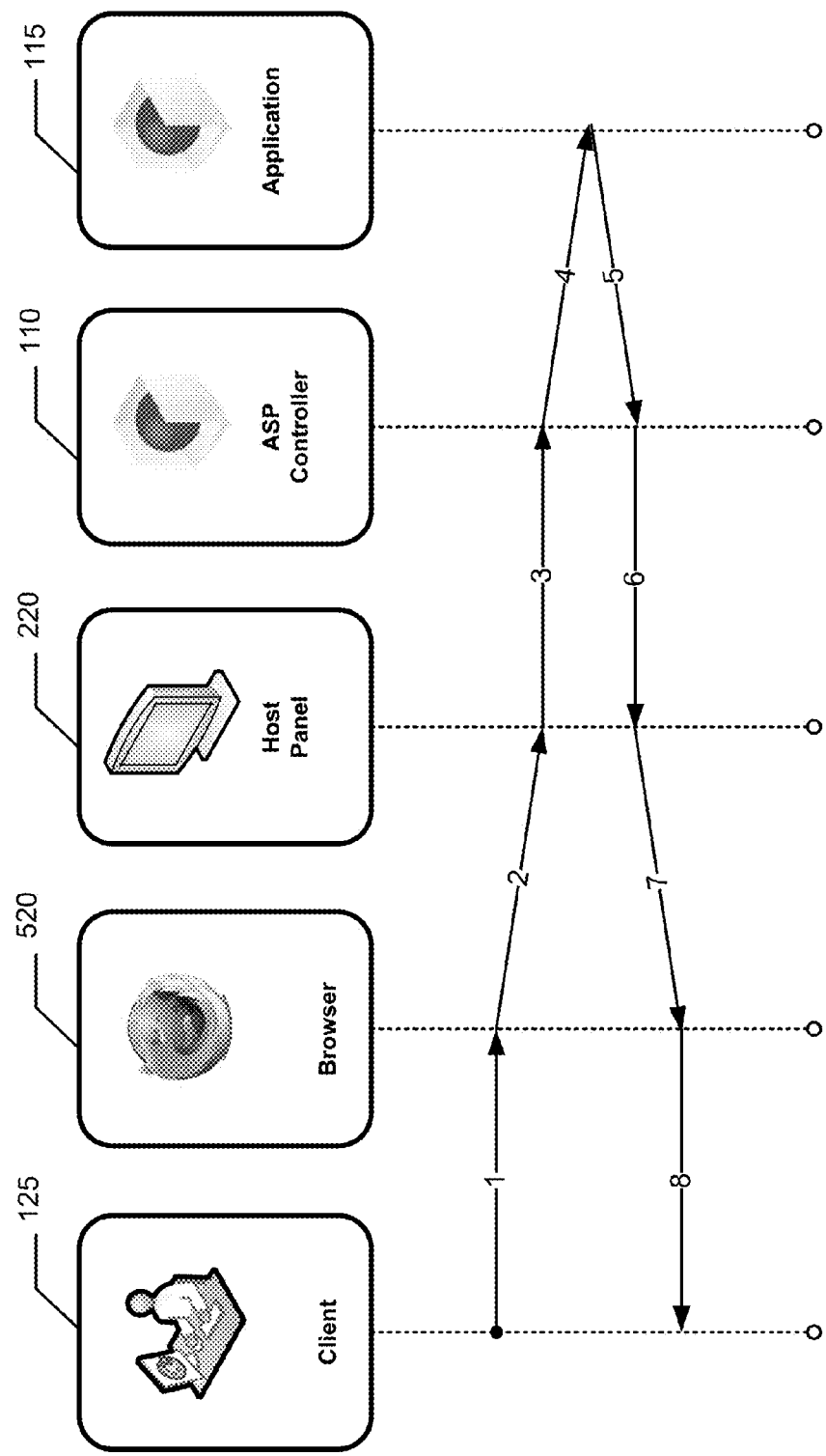
FIG. 5 illustrates a simple widget, in accordance with the exemplary embodiment.

FIG. 5 illustrates a simple widget in accordance with the exemplary embodiment. The APS application can serve as a widget, which has a visual representation in an allocated screen area. The widget has an HTML representation and communicates with its application via HTTP. In one embodiment, the widget can be placed on a host control panel. The widget has an element (a button or a link) for sending a GET request to the application. The request arrives to an application entry point—the APS controller, which makes the application execute a required script (using certain parameters). If the request needs some data, the data is displayed for the client on a browser page.

In another embodiment, the widget is a form with a text box(s) and a submit button. The press of the button triggers sending a POST request to the application. The APS controller calls a required script for execution. If the widget is a user authorization form, the answer can be checking of the login and the password. If the check is successful/unsuccessful, the user is given an HTML welcome/denial page.

A simple widget in FIG. 5 sends a GET request to the application in order to receive the HTML content. The client 125 clicks on an application 115 hyperlink on a browser page 520. The browser sends the user GET request to a server, where the request is received by the host panel 220. The host panel 220 passes the GET request to the ASP controller 110. Subsequently, the ASP controller 110 makes the application 115 to execute a particular widget method. As result, the application 115 returns an HTML code. The ASP controller 110 sends the HTML code to the host panel 220. The panel 220 sends the HTML code to the browser 520. The browser 520 reflects the HTML code as a widget page.

Figure 6:
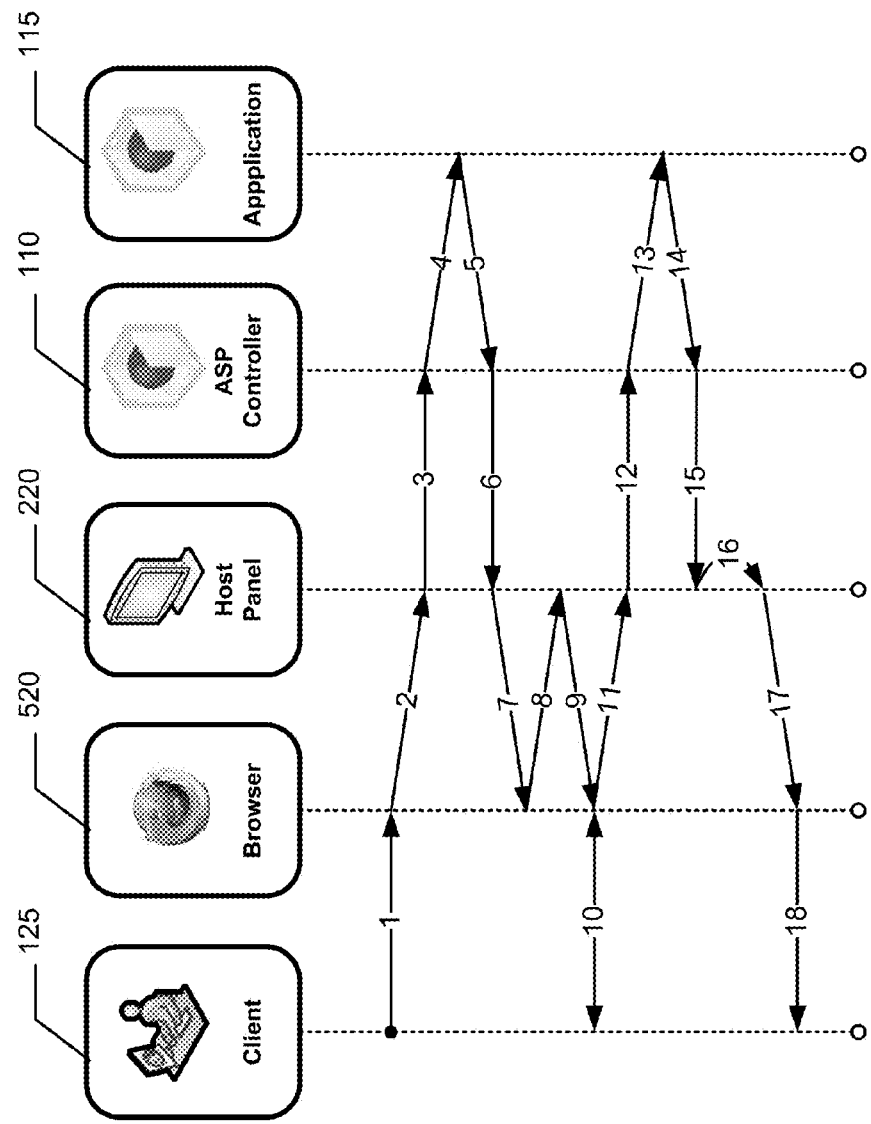
FIG. 6 illustrates using a form-type widget, in accordance with the exemplary embodiment.

FIG. 6 illustrates using a form-type widget, in accordance with the exemplary embodiment. A client 125 fills in text boxes of an HTML form and clicks a "submit" button. The browser 520 sends the data from the HTML form using POST request. The host panel 220 receives the POST request data and passes it to the APS controller module 110. The APS controller module 110 makes the application 115 to execute the widget method for processing the data from the form. The application 115 forms a response in a form of the HTML code.

The APS controller module 110 sends the HTML code to the host panel 220. The host panel 220 sends the HTML code with an http header (for redirection) to the browser 520. Since the HTML code contains a redirect header, the browser 520 requests a page at a new address. The host panel 220 provides the new page to the browser 520. The client 125 sees a new page with the data reflecting the fields to be filled out or an OK button or an OK button with a time out before next process.

After the client clicks the button again (or after the time out), a confirmation request goes to the host panel 220. The host panel 220 passes the request to the APS controller module 110. The APS controller module 110 calls the widget method corresponding to the request. The application 115 executes the widget method and provides a message to the APS controller module 110. The APS controller module 110 passes the message to the host panel 220. The host panel 220 changes appearance of the page for the client 125 based on the message. A new look of the host panel 220 is provided to the browser 520. The browser 520 reflects the new panel to the client 125.

According to the exemplary embodiment, the APS has some roles and policies for its users. A user account (i.e., a company account) can be a provider, a reseller or a customer. A user role (i.e., a set of rights) can be an owner, a referrer or an administrator. A user privilege can be a permission for a certain action such as allow changing a type of an application and allow working with the APS controller.

The users communicating with the APS application must be in one of the roles: a resource owner (i.e., a user of the system that owns the APS resource) or a resource referrer (i.e., a user of the system that has an APS link to the APS resource, but does not own it). Note that the resource administrator always has a full access to the APS resource. The predefined list of roles includes a provider, a reseller, an administrator and an end user. More roles are available, if needed.

According to the exemplary embodiment, the APS Application Programming Interface (API) can be divided into internal and external APIs. The internal API has a set of control parameters that are passed to the application for controlling it (i.e., installation, update, deletion, etc.). The external API is a set of parameters used by the application in order to perform operations requested by the end-user. The parameters (commands) are passed via entry points (IP or web addresses). The APS controller intercepts the parameters and makes the application react according to the parameters.

For example, a request to the application to list its resources can be implemented by sending a request to the address https://entry.application.com/services<ID>, where <ID>— is an identifier of the application. In response to the request, the application produces a JSON representation of the resource in the http response:

```
{
  "aps": {
    "id": "18CE45AC-7ABE-4a1f-B028-F45CD18AEBE1", // Resource identifier
    "type": "http://www.aps-standard.org/core/resource#1.0", // Type
    "status": "aps:ready" // Resource Status
  },
  ... /* configuration */ ...
  ... /* links */ ...
}
```

According to the exemplary embodiment, a resource is an instance of an application packaged as a configuration file (or database records), which can be used in the context of the application. The configuration file specifies software-hardware environment for launching the application, allocated quotas, clients for whom the current configuration is intended.

Figure 7:
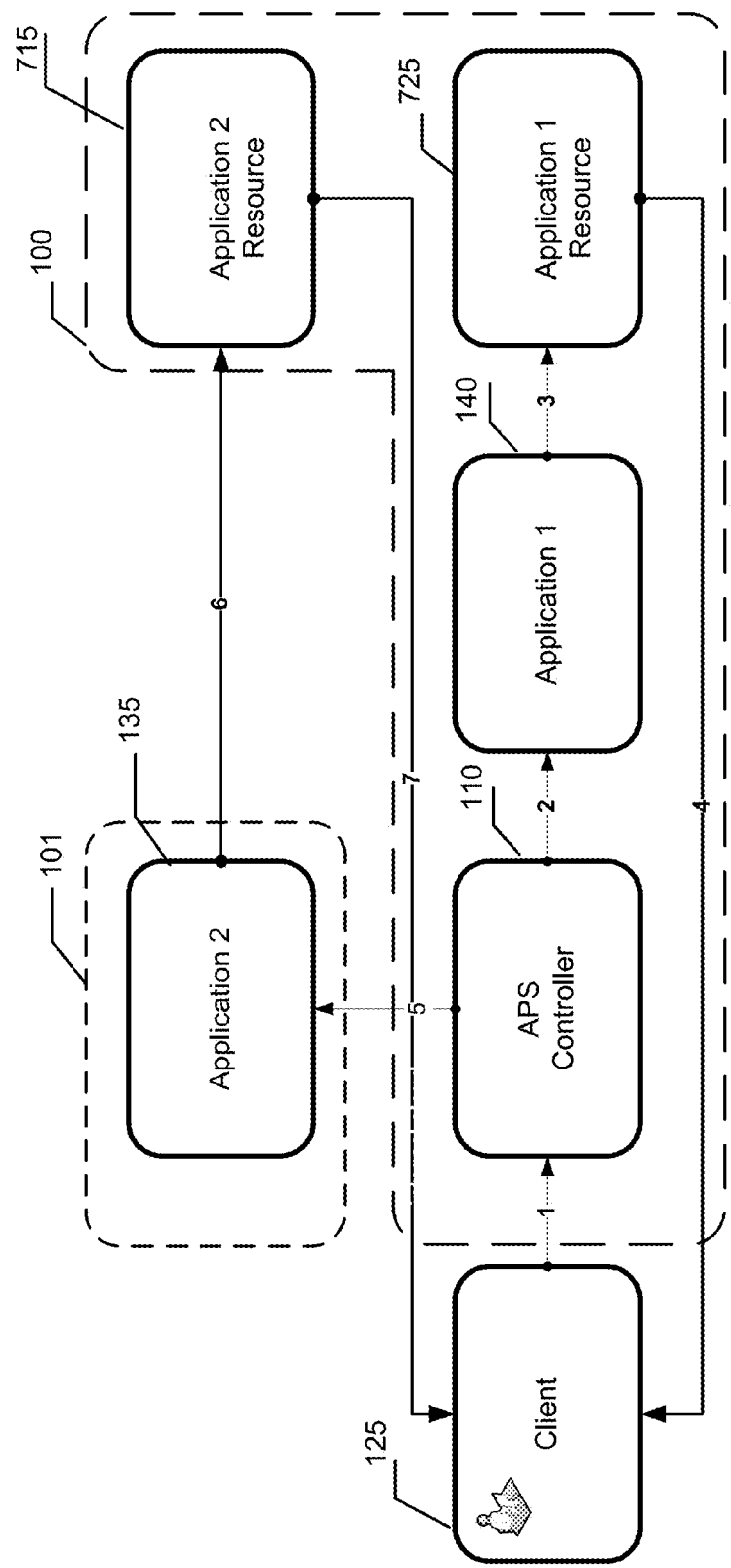
FIG. 7 illustrates application provisioning, in accordance with the exemplary embodiment.

The application provisioning is depicted in FIG. 7. A client 125 of a host (cloud) 100 requests a resource to use. If the application 140, which owns the resource, is located on the server of the host cloud 100, the APS controller 110 sends the HTTP request containing work parameters of the resource to the application 140. Subsequently, the application 140 creates an instance 725 of the resource with client parameters. For example, the application 140 forms and saves a file with the client configuration. The configuration file is called prior to accessing the client resource 725 in order to configure the application 140 before serving the client 125.

Then, the resource 725 becomes available to the client. If the application 135, which owns a resource, is located in the external cloud 101, the APS controller 110 calls the external application 135. The application 135 creates a resource instance 715 on the host could 100 server. Then, the resource 715 becomes available to the client 125.

According to the exemplary embodiment, the application provisioning can be used for provisioning of the resource (if the resource is a special type of the application). The application provisioning includes the following steps:

1. Create a new application resource in the APS controller database in a state of provisioning;
2. Satisfy pre-requisites for every mandatory prerequisite resource. For every resource find/allocate resource of the required type and link the resource using provision( )method;
3. Execute provision( )method of the application resource;
4. Change resource state to ready.

Note that, if any of calls fails, or if provision( ) call fails, all operations are rolled back (i.e., the acquired resources is freed up or removed).

The application declares resource of the application type. The APS controller provisions the resource for each instance of the application. The resource can require one of the available environments. In this case, the APS controller executes all code for provisioning of application's resources and the code for the resource of the application type via the end-point of the environment. Note that for every new application resource, which requires an environment, the new environment has to be created.

According to one exemplary embodiment, the application deployment workflow (for the application requiring the environment) is performed using the following stages:

1. The APS controller provisions the resource of the environment type (as a pre-requisite for the application type);
2. The APS controller creates a new application resource with a strong link to the environment resource;
3. The APS controller calls link( )method of the environment resource and the environment resource sends URI of a new resource location to controller, indicating the APS package of the application;
4. The APS controller calls provisioning method of the application resource (via the end-point of the environment).

The resource of the application type can be upgraded when a new version of the APS package is available. The application upgrade is performed as follows:

1. The APS controller calls the upgrade( )method of the environment resource with URL of the APS package of the application;
2. The APS controller calls the upgrade( )method of the application resource;
3. The application resource performs upgrades (changes) for all of the resources of the application.

According to the exemplary embodiment, when the application calls the corresponding resource, the application acquires the resource (i.e., checks if the resource belongs to the client and launches the application files according to the configuration written in the resource file (or a database)). A resource, in accordance with the exemplary embodiment, can be any of:

- an application having a special client configuration or a configuration for all clients;
- a service (not optional functions/methods of the application);
- an application extension (additional functions, add-ons);
- registration/authorization element for the application; and
- a widget.

Simple examples of the resource are provided in the appendix iii.

Note that if the application is partitioned into an unknown software/hardware environment of the host provider or the client requires a special configuration (different from the server configuration), the system can set up a virtual environment for running the application. In order to do this, an environment resource is launched during the provisioning. A request with the required environment parameters in its header(s) is sent to the required address. The environment parameters can be an operating system, a programming language required for interpreting the application code, a size of an operating memory, a processor architecture, etc.

According to the exemplary embodiment, an "Environment" type of resource allows to deploy an APS application inside the environment. The environment resource exposes application's resources via HTTP end-point and executes provisioning scripts of these resources. The environment resource can be required based on the application type. The environment must be able to create an end-point for application resources, extract application files from the APS package and deploy the files at the end-point. The environment can also upgrade files of existing application(s).

According to the exemplary embodiment, the environment declares preUpgrade( ) and postUpgrade( )methods that accept a URL with APS package input address. When the preUpgrade( )method is called, the environment downloads the package and deploys it in such a way that the end-point of the environment resource is mapped to a script/code folder of the package. When the postUpgrade( )method is called, the environment downloads the package and deploys new files at the existing end-point.

According to the exemplary embodiment, the environment resource implements an APS resource interface (i.e., an application API). Also, the environment interface implements provisioning of an application workflow. An exemplary environment configuration structure is provided in the appendix iv.

The resource entry-point URI is available as a part of the environment resource configuration where the deployed application serves as the environment's URI element, as demonstrated in this example:

```
{
    "aps": {
        "type": "http://www.aps-
standard.org/infrastructure/virtual/environment/1",
        "id": "16004e17-1604-49ee-a842-13c7daf93750",
        "status": "aps:ready"
    },
    "hostname": "my.host.com",
    "name": "myve",
    "description": "My cool VE",
```

-continued

```
    "hardware": {
        "bandwidth": 1024,
        "cpu": {
            "number": 1,
            "power": 2700
        },
        "diskspace": 2048,
        "memory": 2048
    },
    "platform": {
        "arch": "i386",
        "os": {
            "name": "Linux",
            "version": "centos-6"
        }
    },
    "status": {
        "state": "stopped",
        "transition": "starting"
    }
}
```

According to the exemplary embodiment, security of the application entry point is ensured by an SSL certificate installed into the entry point. In order to get the SSL certificate, the environment resource accesses the ASP controller and requests the SSL certificate. Upon accepting the request for a specific application, the environment makes sure that the request sent by the APS controller using SSL certificate matches the SSL of the entry point. Here, the only URL from which the application can be requested is one received through the APS controller. The APS controller encrypts the certificate using a secret key, which means that anyone with a corresponding public key can decrypt it, but can be certain of who encrypted it. Thus, if a fake site sends a request, it will be apparent that it is fake, since it doesn't know the secret key.

According to the exemplary embodiment, the environments perform the same operations for the applications as they do for the web applications:

- extract the application into the environment directory (the directory should be used by only this environment);
- setup a virtual site (or a directory) on a web-server environment (mapping should match the web application description language interface definition for the application);
- ensure security on the virtual site.

Figure 8:
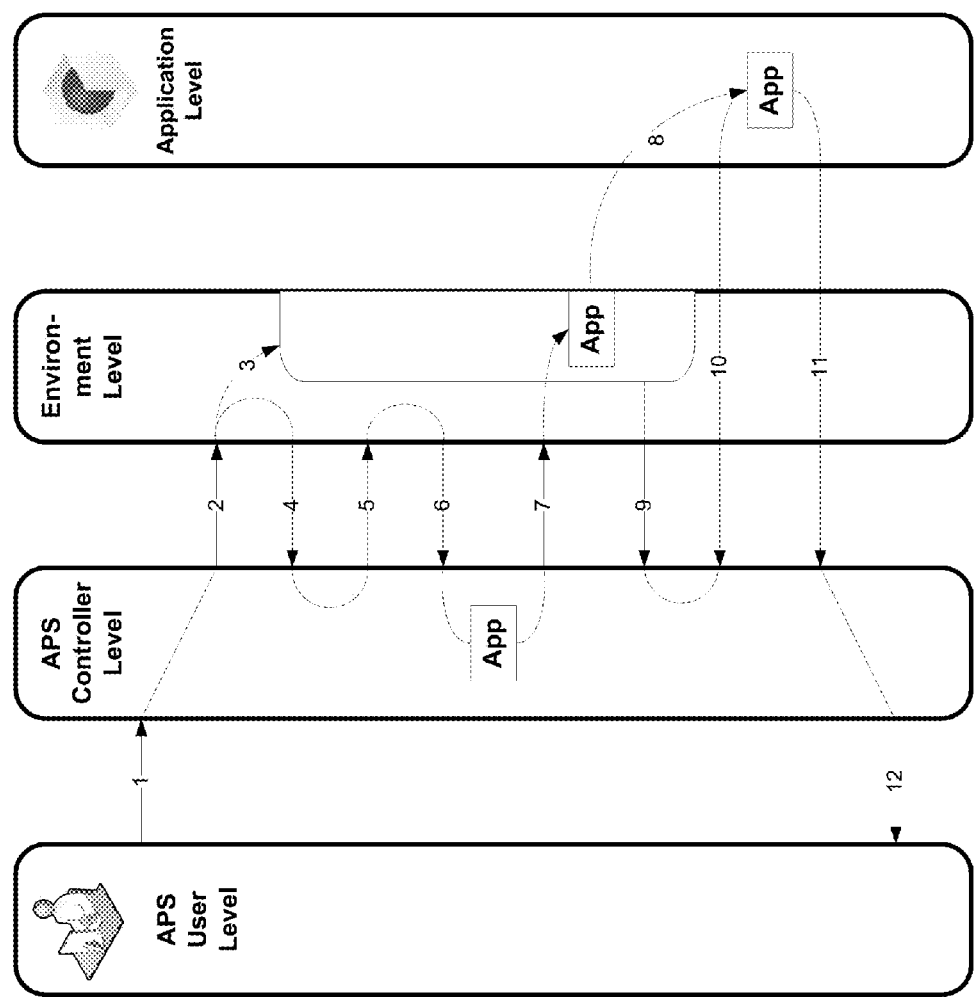
FIG. 8 illustrates launching of the application in a virtual environment.

FIG. 8 illustrates launching of the application in a virtual environment. An owner of the APS application sends a request to the APS controller level for launching his application in the virtual environment (step 1). The APS controller makes a request for creation of the virtual environment (step 2). The environment resource (at the environment level) creates the virtual environment according to the APS package metadata (step 3). The environment resource returns OK if the request is successfully executed. The APS controller requests an address for accessing the environment (step 5).

The environment returns the address and request for APS package (step 6). The package is delivered to the environment (step 7). The APS package is unfolded and becomes a functioning application (step 8). The environment returns OK and the address of the application (in the virtual environment) entry point (step 9). The APS controller calls the application at the given address (step 10). The application returns OK to the ABS controller (step 11). The ABS controller returns OK to the owner of the APS (step 12).

The application resource uses computer system resources. The resource usage is monitored and provided to the host platform, which does not know about dynamic statistics of the application execution. The host platform only knows about allocated quotas that cannot be exceeded by the application. Additionally, a usage of business quotas is monitored for each class of applications. For example, for an application, which performs a site backup, the business quota can be a number of the backups performed over a billing cycle. Other examples of monitored application execution parameters are:

a disk space;
a processor load;
a number of processed requests;
an number of files in an account;
a number of slow request to a database;
a data reflecting already used resources over a time period (this data is available to the APS, but not to the host, which only knows about the quota);
a business matrix (i.e., a number of mail boxes, IP addresses, etc.) and other statistics for different classes of the applications.

The APS uses common application properties described in the APP-META.xml:

An Application ID:
<id>http:**www.phpbb.com/</id>

The Application ID is a URI-formed unique application identifier. This string is used as the application identifier, which cannot be changed in any consequent versions of the application packages. Otherwise, the package upgrade and the patch from older versions cannot be implemented.

A Package Name
<name>phpbb</name>

The Package Name is a free-formed short string, which specifies user-visible name of application in the package. The Package Name can be changed during the upgrade. It should reflect packaged software name.

A Package Version
<version>2.0.22</version>
<release>6</release>

The Package Version consists of two parts: an application version and a package release. The application version corresponds to the version of application packaged, and the package release corresponds to the release of the package containing the same version of the application. Note that the packages can be released several times (e.g., for fixing bugs in packaging or adding localizations—generally there are common practices for numbering of release versions, builds, and revisions, however, each developer can follow his own rules if he wishes. Typically, if all that is fixed are minor bugs, then the version remains the same, but the release number will be incremented.).

A version format and the algorithm for determining the chronological relationship between different package versions are specified by the version-Policy. Note that the application version and the package release are separated to ease parsing.

A Homepage
<homepage>http:**phpbb.com/</homepage>

The Homepage property is the URL of the application official site.

Add-on property is written to match APSv2 (requires a master, share master's environment)
<master-package>
<package id="http:**www.phpbb.com" match="version=1.1"/>
</master-package>

If a package is an add-on package for another APS application this definition provides a reference to the master package by the ID and the version/release properties. Optional property is provided by a match XPath expression. The virtual node's version and release in the context of the expression represent the version and the release of the master package.

Before installation, the APS controller must check availability of referenced APS package in a given context. Add-on packages can access the global settings of the master package. Add-on package has access to the same set of resources as the master package.

A Software Vendor Information property
<vendor>
<name>Broombla Corporation</name>
<homepage>http:**broombla.com</homepage>
<icon path="icons/broombla-corp-logo.gif"/>
</vendor>

The Software Vendor Information property reflects characteristics of a software vendor whose application is packaged. The icon/@path attribute contains a full path in archive to the icon file. The icon is a 64×64 pixel image in PNG format using alpha transparency. JPEG and GIF formats can be used as well, but their use is discouraged.

A Software Packager Information
<packager>
<name>Parallels</name>
<homepage>http:**parallels.com</homepage>
<icon path="icons/parallels-package-logo.gif"/>
<uri>uuid:15d041e8-34c6-409a-b165-3290d2c9d599</uri>
</packager>

A Software Packager Information reflects characteristics of a package manufacturer. The icon/@path attribute contains a full path in archive to the icon file. The icon must be a 64×64 pixels image in JPEG, PNG or GIF format. The URI element is an arbitrary URI unique for each packager. This URI is needed to distinguish packages with the same name but created by different packagers. Note that consequent versions of the same package must have the same URI. Otherwise, package controllers might refuse to update package from one version to another.

The controllers allow for upgrade and patching of the package from a version, which does not specify the URI, to the version, which specifies the URI in order to support smooth upgrade path for the packages that did not use the URI from the beginning.

A Summary property
<presentation>
<summary>
High powered, fully scalable, and highly customizable Open Source bulletin
board package.
</summary>
</presentation>

A Summary property is a single-sentence summary of the package for the end users.

A Description property
<description>
phpBB is a high powered, fully scalable, and highly customizable
Open Source bulletin board package. phpBB has a user-friendly
interface, simple and straightforward administration panel, and helpful FAQ. phpBB is the ideal free community solution for all web
   sites.
   </description>
A Description property is a one-paragraph description of the package for the end users.
   An Icon
   <icon path="images/phpbb.png" I>
The Icon can be provided to be displayed in a GUI for the application. The path attribute must contain a full path in the archive to the icon file. The icon is a 64×64 pixel image in PNG format using alpha transparency.
   Screenshots property
   <screenshot path="images/admin.png">
   <description>Administrative interface</description>
   </screenshot>
   <screenshot path="images/main.png">
   <description>Main page</description>
   </screenshot>
Several screenshots with descriptions can be provided. The path attribute contains a full path in the archive to the screenshot file. It must be JPEG, PNG or GIF image.
   Changelog property
   <changelog>
   <version version="2.1.22" release, "1">
   <entry>New upstream version</entry>
   </version>
   <version version="2.1.21" release="5">
   . . .
   </version>
   . . .
   </changelog>
The Changelog contains the human-readable list of changes between consecutive package versions. An order of entries in the changelog is not specified, the entries are sorted by the APS controller.
   Categories
   <categories>
   <category>Collaboration/Portals</category>
   <category>Web/Content management</category>
   </categories>
A package can include a set of categories. The category is a unicode string without attached semantics. The first category should be "primary category" in a sense that the first category is sufficient for sorting packages in the user interface. A list of pre-defined categories is available in APS categories catalog. The specified categories names must be used. Other categories names can be used, but handling them in the APS Controller is optional.
   Languages
   <languages>
   <language>en</language>
   <language>de</language>
   <language>ru</language>
   </languages>
The package can declare a set of languages for the presentation purposes. The first language is a default language of the application. Languages are identifiers from ISO-639.
   Updates
The application can declare versions of packages which can be updated to the current package. Two update strategies are supported:
A patch—version change without major changes in application settings and without any changes in deployment logic. In particular, all allocated resources are left as is, and no changes in the application mapping scheme are allowed. Moderate changes in the application settings are allowed, however several classes of changes that can lead to ambiguity are prohibited.

Such restrictions allow unattended update of all application instances, thus making patches a preferable way to apply crucial changes, such as security fixes. If a patch fixes security problem or problem that affects all software users, it should declare the recommended element. Otherwise, it is assumed that the patch fixes some specific problem or implements additional functionality and is intended to be installed only by those users who are experiencing the problem.

An upgrade—a version change, which allows complex changes in application settings and deployment logic. This operation may require a user attendance. A package can specify which versions it can update with a help of a match attribute. This attribute contains expression that is evaluated against a metadata of the installed packages with the same id (or a name/packager pair for older packages) and a lower version/release numbers.
   Specification of exact updatable versions:
   <patch match="(version='2.0' and release='1')
   or (version='2.0' and release='2')" recommended, "true"/>
   <upgrade match="version='1.0' and release='1'"/>
The above specification means that the package can patch the installed version 2.0.1 or 2.0.2 and upgrade version 1.0.1.
   Specification of updatable version ranges:
   <patch match="version >'2.0'" recommended="true"/>
   <upgrade match="version >'1.0'"/>
   The above specification means the following:
If the installed version is greater than 2.0, patch is possible. Patch contains crucial fixes affecting all application users. If the installed version is greater than 1.0 and less or equal to 2.0, upgrade is possible.
   Compare versions with vercmp
   <patch match, "vercmp(version,'2.1.0a')=1"/>
   Controller selects all versions greater than 2.1.0a.

According to the exemplary embodiment, the application is supposed to provide services to its users or other applications. Complex applications can provide several services of a different nature and logic. Any service is a set of resources of a specified type provided by the application. In the simplest case, a resource is an application instance itself. Distinct services are declared by service elements such as name, settings, presentation, service type, service resource, etc.

The class attribute can be used to inform a control panel about the destination web resource. The following values of this attribute are predefined:
   an official—an official site of an application or an application vendor;
   a community—an application community portal;
   an admin-howto—a resource contains "how to" articles for the administrator;
   howto—a resource contains howto articles for the end-user;
   a support—a support service site;
   a demo—an online application demo.
The APS controller can use this information when grouping the links or optionally displaying them. The APS controller ignores unknown values of the class attribute and treats it as unspecified.

Figure 9:
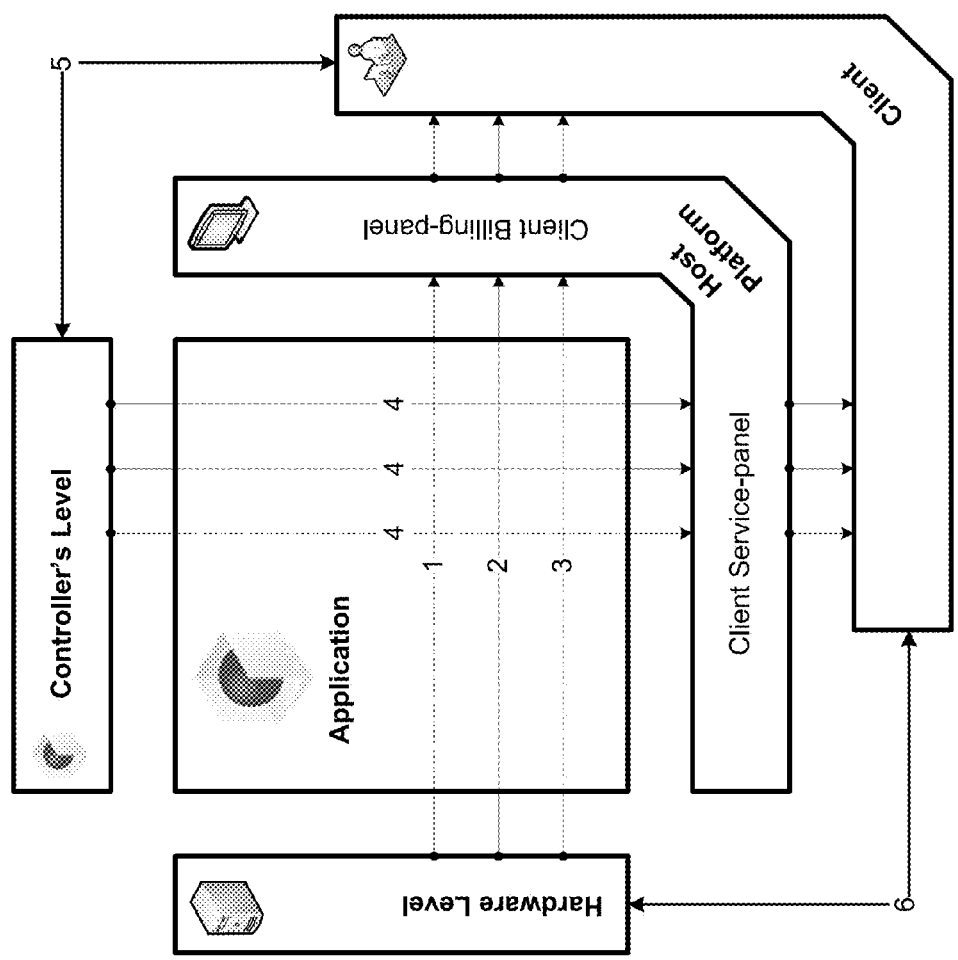
FIG. 9 illustrates monitoring of resources used by an application, in accordance with the exemplary embodiment.

FIG. 9 illustrates monitoring of resources used by an application, in accordance with the exemplary embodiment. The monitoring of the application is implemented as follows:

1. Operating memory of the host server (monitoring, sending data to the host and to the client);
2. Operating time of the host server central processor;
3. Disk space occupied by the client data;
4. A number of application business substances used by the client (e.g., a number of mail boxes, sent and received messages, etc.);
5. Client works with the application and uses the application resources;
6. Client works with the application and uses the server resources.

The packaged application data can be filtered based on type or size occupied on the disk. The contents of the APS packet can be distributed to various virtual hosts based on the algorithm defined in the configuration file of the cloud server's software. For example, if a client logs into his server's control panel for the first time using the address "canada.hosting.com," the authorization form will be presented in English, with the Canadian flag. If the client logs into his control panel for the first time using the address "turkey.hosting.com," the form will be displayed in Turkish, with the Turkish flag. Both sub-domains are located on the same server, and the configuration file includes the rules in the "mod_rewrite" module.

The rules require that when the client uses the "canada.hosting.com" address, the language settings are taken from the APS package (in effect, a package with skins) and are copied to his home folder, for the virtual host that belongs to the Canadian user. Similarly, if the client used the address "turkey.hosting.com," Turkish language settings are taken from the APS package and the virtual host uses Turkish client settings and images. As such, each virtual host (and a typical production environment can have thousands of virtual servers on each physical server) does not need to maintain all the local settings and configurations in its own file space, while only a handful of them are typically used.

According to the exemplary embodiment, the APS catalog can include both applications and plug-ins. The application user, knowing his own login/password, can download and install the plug-in for his application directly from within the application. Another mechanism for user identification can be a token ID (a unique identifier which is generated and sent from a server to a software client to identify an interaction session, which the client usually stores as an HTTP cookie).

Note that, if a buyer of the application is a host who distributes the application to its own subscribers, then packet-based installation can be used for one plug-in to all the applications installed on all the clients.

Those skilled in the art will appreciate that the proposed method provides for an efficient integration of an application into a cloud (server) according to the application packaging standard (APS).

Figure 10:
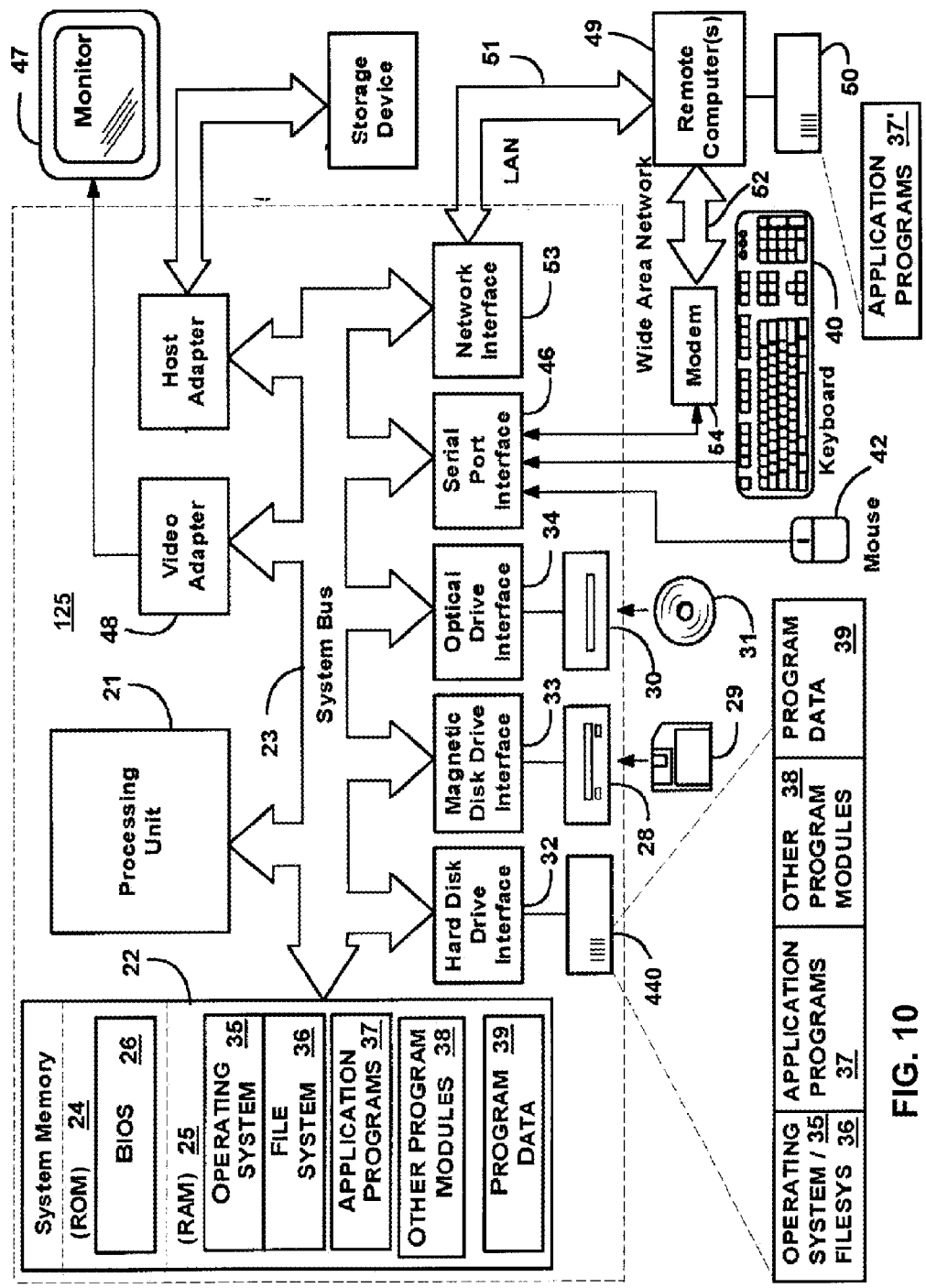
FIG. 10 illustrates an example of a computer (or a host server) on which the invention may be implemented.

With reference to FIG. 10, an exemplary system for implementing the invention includes a general purpose computing device in the form of a host computer or a server 125 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes a read-only memory (ROM) 24 and random access memory (RAM) 25. A basic input/output system 26 (BIOS), containing the basic routines that help to transfer information between the elements within the personal computer 125, such as during start-up, is stored in ROM 24.

The computer 125 may further include a hard disk drive 27 for reading from and writing to a hard disk, not shown herein, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 125.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., Microsoft Windows™ 2000). The computer 125 includes a file system 36 associated with or included within the operating system 35, such as the Windows NT™ File System (NTFS), one or more application programs 37, other program modules 38 and program data 39. A user may enter commands and information into the personal computer 125 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, and they may also be connected by other interfaces, such as a parallel port, game port or universal serial bus (USB).

A monitor 47 or other type of display device is also connected to the system bus 23 via an interface, such as a video adapter 48. In addition to the monitor 47, personal computers typically include other peripheral output devices (not shown), such as speakers and printers.

The personal computer 125 may operate in a networked environment using logical connections to one or more remote computers 49. The remote computer (or computers) 49 may be another personal computer, a server, a router, a network PC, a peer device or other common network node, and it typically includes some or all of the elements described above relative to the personal computer 125, although here only a memory storage device 50 is illustrated.

The logical connections include a local area network (LAN) 51 and a wide area network (WAN) 52. Such networking environments are common in offices, enterprise-wide computer networks, Intranets and the Internet. In a LAN environment, the personal computer 125 is connected to the local network 51 through a network interface or adapter 53. When used in a WAN networking environment, the personal computer 125 typically includes a modem 54 or other means for establishing communications over the wide area network 52, such as the Internet.

The modem 54, which may be internal or external, is connected to the system bus 23 via the serial port interface 46. In a networked environment, the program modules depicted relative to the personal computer 125, or portions thereof, may be stored in the remote memory storage device. It will be appreciated that the network connections shown are merely exemplary and other means of establishing a communications link between the computers may be used.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

APPENDIX i

```
APP-META.xml              # Metadata container. XML file.
APP-LIST.xml              # List of files in package and signing
data
scripts/
   wordpress.php          # This script will be invoked when
application
   ...
   ...                    # instance is managed
   ...                    # Additional files to be used by
the 'wordpress.php'
   ...                    # reside in the same directory
schema/
   wordpress.schema       # Wordpress resource schema
   ...
images/
   icon1.png              # Icon and screenshots of the
application
   screenshot2.jpg
   screenshot.jpg
   ...
htdocs/                   # Application files
   index.php
   logo.png
   ...
```

APPENDIX ii

```
Notation fragment:
default namespace aps = "http:**aps-standard.org/ns/2"
namespace       local = " "
grammar {
   start = Application
   Application = element application {
   ## Version of APS format used
   attribute version { "2.0" },
   ## Packaging date
   attribute packaged { xsd:dateTime }?,
   ## Unique application identifier
   element id                 { xsd:anyURI },
   element name               { text },
   element version            { text },
   element release            { text },
   element homepage           { xsd:anyURI }?,
   ## Reference on master package for add-on package
   element master-package {
      element package {
         attribute id { xsd:anyURI },
         attribute match { text } ?
      }+
   }?,
   element vendor {
      element name            { text }+,
      element homepage        { xsd:anyURI }*,
      element icon            { attribute path { text } }?
   }?,
```

APPENDIX ii-continued

```
   element packager {
      element name            { text }+,
      element homepage        { xsd:anyURI }*,
      element icon            { attribute path { text } }?,
      element uri             { xsd:anyURI }?
   }?,
   element presentation {
      element summary         { text }*,
      element description     { text }*,
      element icon            { attribute path { text }
}?,
         element screenshot { attribute path { text },
                       element
description { text }+
         }*,
         element changelog {
            element version { attribute version { text
},
                        attribute
release { text },
                        attribute date
{ xsd:dateTime }?,
                        element entry {
text }+
            }*
         }?,
         element categories { element category { text }+
}?,
         element languages {
            element language { xsd:string { pattern =
"[a-z]{2,3}" } }+
         }?
      }?,
      element patch { attribute match { text },
                        attribute recommended {
"true" }? }*,
         element upgrade { attribute match { text },
                        attribute mode {
"managed" | "backup" }? } *,
         Service*
   }
```

APPENDIX iii

```
Application resource schema:
{
   "apsVersion": "2.0",
   "name": "Application",
   "id": "http://aps-
standard.org/types/core/application/1.0",
   "implements": [ "http://aps-
standard.org/types/core/resource/1.0" ],
   "operations": {
      "preUpgrade": {
         "name": "blog",
         "verb": "PUT",
         "path": "/preUpgrade"
      },
      "postUpgrade": {
         "name": "blog",
         "verb": "PUT",
         "path": "/postUpgrade",
         "parameters": {
            "version": {
               "type": "string",
               "kind": "query"
            }
         }
      }
   }
}
```

APPENDIX iv

```
Environment configuration structure
Environment type schema:
{
  "apsVersion": "2.0",
  "name": "Environment",
  "id": "http://aps-standard.org/types/infrastructure/environment/1.0",
  "properties": {
    "entryPoint": {
      "type": "string",
      "description": "Application access point"
    },
    "engines": {
      "type": "array",
      "items": {
        "type": "string",
        "description": "List of supported engines",
        "pattern": "php|python|perl|java|.net|exec|.+"
      }
    },
    "hardware": {
      "type": "Hardware"
    },
    "platform": {
      "type": "Platform"
    }
  },
  "structures": {
    "OS": {
      "type": "object",
      "properties": {
        "type": {
          "type": "string",
          "description": "Operating system name",
          "pattern": "Windows|Linux|MacOS|.+"
        },
        "name": {
          "type": "string",
          "description": "Operation system distribution",
          "pattern": "redhat|centos|debian|ubuntu|cloudlinux|.+"
        },
        "edition": {
          "type": "string",
          "description": "Operation system edition",
          "pattern": "datacenter|server|desktop|.+"
        },
        "version": {
          "type": "number",
          "description": "Operation system Version in format <major>.<minor>"
        }
      }
    },
    "CPU": {
      "type": "object",
      "properties": {
        "number": {
          "type": "integer",
          "description": "Number of CPUcores"
        },
        "power": {
          "type": "number",
          "description": "CPU Power in MHz"
        }
      }
    },
    "Platform": {
      "type": "object",
      "properties": {
        "arch": {
          "type": "string",
          "description": "System architecture",
          "pattern": "x86|x86_64|ia64|arm|.+"
        },
        "os": {
          "type": "OS",
          "description": "System operating system"
        }
```

APPENDIX iv-continued

```
      },
      "Hardware": {
        "type": "object",
        "properties": {
          "bandwidth": {
            "type": "integer",
            "description": "Bandwidth in Mbps"
          },
          "cpu": {
            "type": "CPU"
          },
          "diskspace": {
            "type": "integer",
            "description": "Disk space in Mbytes"
          },
          "memory": {
            "type": "integer",
            "description": "Memory size in Mbytes"
          }
        }
      }
    }
  }
}
```

APPENDIX V

The application packaging controller receives API instructions from users using "http" or "https" protocol and launches application scripts required for execution of the instructions. The URL Mapping for these instructions is as follows:

| Method | Path | Description |
| --- | --- | --- |
| GET | /resources/{id} | Get Resource |
| PUT | /resources/{id} | Configure Resource |
| POST | /resources | Provision Resource |
| DELETE | /resources/{id} | Unprovision Resource |
| GET | /resources | Listing |
| GET | /resources?type=...&filter=... | Filtering |
| GET | /resources?start=...&limit=...&order=... | Pagination |
| <any> | /resources/{id}/... | Resource Interface Proxy |
| GET | /resotces/{id}/{relation} | Get linked resources |
| POST | /resources/{id}/{relation} | New link |
| DELETE | /resources/{id}/{relation}/{id2} | Delete link |
| <any> | /resources/{id}/{relation}/{id2}/... | Relation Resource Alias |
| GET | /resources/{id}/aps/links | List all resource links |
| POST | /resources/{id}/aps/links | Link resources |
| DELETE | /resources/{id}/aps/links/{id} | Unlink Resources |
| POST | /resources/{id}/aps/log | Log event |
| GET | /resources/{id}/aps/log | Get Log Events |
| DELETE | /resources/{id}/aps/log | Delete Log Events |
| POST | /resources/{id}/aps/subscriptions | Subscribe to Events |
| GET | /resources/{id}/aps/subscriptions | Get Event Subscriptions |
| POST | /resources/{id}/aps/events | Post Event |
| GET | /resources/{id}/aps/events?time=... | Get Pending Events |
| GET | /applications | Applications Collection |
| GET | /applications/{app} | Get Application Info |
| <any> | /application/... | Application Alias |
| POST | /application/{service} | Register Resource |
| GET | /application/{service}/{id} | Get Application Resource |
| PUT | /application/{service}/{id} | Update Resource |
| DELETE | /application/{service}/{id} | Unregister Resource |
| GET | /types | List all types |
| GET | /types/{id} | Get Particular Type |
| GET | /types?id={type-id} | Find type by type-id |
| GET | /types?composing={type-id} | List types composing type |
| GET | /types?implementing={type-id} | List types implementing type |

-continued

| Method | Path | Description |
| --- | --- | --- |
| GET | /packages | List all packages |
| GET | /packages/{id} | Get Package |
| GET | /packages/{id}/APP-META.xml | Get Package Meta |
| GET | /packages/{id}/<path>et | File from Package |

APPENDIX VI

A deployed application has APIs that are required to be exposed from an Application Packaging Standard application:

| Method | Path | Description |
| --- | --- | --- |
| POST | /{service-id} | Provision Resource |
| GET | /{service-id}/{id} | Get Resource |
| PUT | /{service-id}/{id} | Update Resource (Reconfigure) |
| DELETE | /{service-id}/{id} | Unprovision Resource |
| POST | /{service-id}/{id}/{relation} | Link Resource |
| DELETE | /{service-id}/{id}/{relation}/{id2} | Unlink Resource |
| <any> | /{service-id}/{id}/... | Other Operations |
| POST | /{main-service-id}/upgrade | Upgrade of application |
| GET | /{service-id}/$default | Get Resource Defaults |
| GET | /{service-id}/$schema | Get Type Schema |

What is claimed is:

1. A computer-implemented method for verification of an application package capability and integration of an application resource into a cloud, the method comprising launching an application packaging controller to perform the following:
   (A) application resource management, including:
      (i) acquiring an application resource page-by-page using an application resource identifier, wherein the application resource is an object of an application domain model, wherein the application resource has its own set of properties and events;
      (ii) updating a configuration of the application resource and generating a resource changed event;
      (iii) updating the application resource after the updating of the configuration of the application resource performed in (ii);
      (iv) provisioning the updated application resource and generating a resource available event;
      (v) un-provisioning the provisioned updated application resource and generating a resource removed event;
      (vi) getting a list of available application resources that are being managed and available application resource types;
      (vii) working as an interface proxy of the updated application resource;
      (viii) managing links between the updated application resource and any other application resources that are being managed and generating a linked event or an un-linked event;
      (ix) setting an alias to the linked updated application resource from (viii);
      (x) registering the updated application resource and generating a resource available event; and
      (xi) unregistering the updated application resource and generating a resource removed event;
   (B) execution of the resource changed event of (A)(ii), the resource available event of (A)(iv), the resource removed event of (A)(v), the linked event of (A)(viii), the un-linked event of (A)(viii), the resource available event of (A)(x) or the resource removed event of (A)(xi), including:
      (i) logging of the resource changed event of (A)(ii), the resource available event of (A)(iv), the resource removed event of (A)(v), the linked event of (A)(viii), the un-linked event of (A)(viii), the resource available event of (A)(x) or the resource removed event of (A)(xi);
      (ii) subscribing to the resource changed event of (A)(ii), the resource available event of (A)(iv), the resource removed event of (A)(v), the linked event of (A)(viii), the un-linked event of (A)(viii), the resource available event of (A)(x) or the resource removed event of (A)(xi); and
      (iii) notifying the application packaging controller of the resource changed event of (A)(ii), the resource available event of (A)(iv), the resource removed event of (A)(v), the linked event of (A)(viii), the un-linked event of (A)(viii), the resource available event of (A)(x) or the resource removed event of (A)(xi); and
   (C) execution of application-related functions, including:
      (i) getting a list of all installed applications and defining a set of application resources affected by the updating of (A)(iii), the provisioning of (A)(iv) and the management of (A)(viii);
      (ii) installing an application with access to the available application resources from (A)(vi);
      (iii) setting an application alias for resource register and resource un-register operations for the installed application from (C)(ii);
      (iv) getting information about Application Packaging Standard (APS) packages, including packaged application resources and skins available for an application package containing the packaged application resources;
      (v) receiving Application Programming Interface (API) instructions from users through Hypertext Transfer Protocol (HTTP); and
      (vi) launching scripts required for execution of the received API instructions by the installed application from (C)(ii).

2. The method of claim 1, further comprising utilizing a utility for verification that the application package conforms to the APS.

3. The method of claim 2, wherein the utility validates the following:
   application package file format;
   application package physical structure; and
   application package metadata file.

4. The method of claim 2, wherein the utility outputs the following data:
   errors indicating why the application package fails to conform to the APS;
   errors indicating requirements that the application package must satisfy to attain a certain certification level; and
   total number of errors related to application package file format, physical structure and metadata.

5. The method of claim 1, further comprising changing of a state of the installed application from (C)(ii) by selecting any of:

ready;
provisioning;
un-provisioned;
configuring; and
deleted.

6. The method of claim 1, further comprising registering the installed application from (C)(ii) in the cloud by assigning an application identifier and an application URI.

7. The method of claim 1, further comprising provisioning of the installed application from (C)(ii) by creating an instance of the installed application from (C)(ii) with a configuration required by a client.

8. The method of claim 1, further comprising performing an upgrade of the updated application resource by creating an application package dedicated to one application resource requiring an upgrade.

9. The method of claim 1, further comprising performing an upgrade of a parent application of the installed application from (C)(ii).

10. The method of claim 1, wherein the application resource management comprises acquiring an application package data that includes any of:
a package name;
an application owner;
execution requirements;
a version number;
application entry points; and
connections to other resources.

11. The method of claim 10, further comprising filtering the application package data based on a data type and size occupied on a disk.

12. The method of claim 1, further comprising creating a virtual environment for execution of the installed application from (C)(ii) comprising a container that virtualizes a single instance of an operating system.

13. The method of claim 12, further comprising the creation of the virtual environment by launching of an environment resource during the installing from (C)(ii).

14. The method of claim 1, wherein the application packaging controller operates in accordance with the APS describing a full life cycle of the application package in the cloud.

15. The method of claim 1, further comprising creating a widget having a button and a link for sending a request for the available application resources to the installed application from (C)(ii).

16. The method of claim 15, wherein the widget has a text box and a button for user authorization.

17. The method of claim 5, further comprising packaging the installed application prior to the step of changing of the state of the installed application from (C)(ii).

18. The method of claim 14, further comprising verifying functionality of the application package.

19. The method of claim 1, further comprising creating connections between the application resources residing in the cloud.

20. The method of claim 1, further comprising combining the available application resources into a single set for renting the set as a single resource.

21. The method of claim 1, further comprising creating a virtual environment for the installed application from (C)(ii) in the cloud; and using the installed application as a widget in another application.

22. The method of claim 1, wherein the getting in (A)(vi) includes filtering of the packaged application resources.

23. The method of claim 1, wherein the managing the links between the updated application resource and any other application resources includes any of: getting the linked updated application resource, getting a new link to the updated application resource, and deleting the link to the updated application resource.

24. The method of claim 1, wherein the logging includes any of set, get, and delete operations.

25. A system for integration of an application resource into a cloud, the system comprising:
a processor;
a memory coupled to the processor;
a host platform running on the processor;
an application packaging controller stored in the memory and executed on the host platform, wherein the packaging controller executes a plurality of scripts for implementing the steps of:
(A) application resource management, including:
(i) acquiring an application resource page-by-page using an application resource identifier, wherein the application resource is an object of an application domain model, wherein the application resource has its own set of properties and events;
(ii) updating a configuration of the application resource and generating a resource changed event;
(iii) updating the application resource after the updating of the configuration of the application resource performed in (ii);
(iv) provisioning the updated application resource and generating a resource available event;
(v) un-provisioning the provisioned updated application resource and generating a resource removed event;
(vi) getting a list of available application resources that are being managed and available application resource types;
(vii) working as an interface proxy of the updated application resource;
(viii) managing links between the updated application resource and any other application resources that are being managed and generating a linked event or an un-linked event;
(ix) setting an alias to the linked updated application resource from (viii);
(x) registering the updated application resource and generating a resource available event; and
(xi) unregistering the updated application resource and generating a resource removed event;
(B) execution of the resource changed event of (A)(ii), the resource available event of (A)(iv), the resource removed event of (A)(v), the linked event of (A)(viii), the un-linked event of (A)(viii), the resource available event of (A)(x) or the resource removed event of (A)(xi), including:
(i) logging of the resource changed event of (A)(ii), the resource available event of (A)(iv), the resource removed event of (A)(v), the linked event of (A)(viii), the un-linked event of (A)(viii), the resource available event of (A)(x) or the resource removed event of (A)(xi);
(ii) subscribing to the resource changed event of (A)(ii), the resource available event of (A)(iv), the resource removed event of (A)(v), the linked event of (A)(viii), the un-linked event of (A)(viii), the resource available event of (A)(x) or the resource removed event of (A)(xi); and
(iii) notifying the application packaging controller of the resource changed event of (A)(ii), the resource available event of (A)(iv), the resource removed event of (A)(v), the linked event of (A)(viii), the un-linked event of (A)(viii), the resource available event of (A)(x) or the resource removed event of (A)(xi); and (C) execution of application-related functions, including:
  (i) getting a list of all installed applications and defining a set of application resources affected by the updating of (A)(iii), the provisioning of (A)(iv) and the management of (A)(viii);
  (ii) installing an application with access to the available application resources from (A)(vi);
  (iii) setting an application alias for resource register and resource un-register operations for the installed application from (C)(ii);
  (iv) getting information about Application Packaging Standard (APS) packages, including packaged application resources and skins available for an application package containing the packaged application resources;
  (v) receiving Application Programming Interface (API) instructions from users through Hypertext Transfer Protocol (HTTP); and
  (vi) launching scripts required for execution of the received API instructions by the installed application from (C)(ii).

26. The system of claim 25, wherein the application packaging controller supports a full life cycle of the installed application in (C)(ii) in the cloud.

* * * * *